2,975,207
O-NITROALKYL PHOSPHOROAMIDOTHIOATES

Fred W. Raths, Memphis, Tenn., assignor to The Dow Chemical Company, Midland, Mich., a corporation of Delaware No Drawing. Filed Dec. 18, 1959, Ser. No. 860,310

4 Claims. (Cl. 260—461)

The present invention is directed to O-nitroalkyl phosphoramidothioates corresponding to the formula

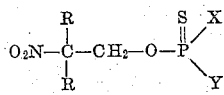

In this and succeeding formulae, each R represents lower alkyl, X represents lower alkylamino and Y represents lower alkylamino or lower alkoxy. The expressions "lower alkoxy" and "lower alkyl" are employed in the present specification and claims to refer to radicals containing from 1–5 carbon atoms, inclusive. These new compounds are a liquid or crystalline solid material which are somewhat soluble in many organic solvents and of low solubility in water. They are useful as herbicides and parasiticides and are adapted to be employed as active toxic constituents of compositions for the control of the growth of seeds and established vegetation and for the control of mite, insect and bacterial organisms such as flies, ascaris, aphids and *Alternaria solani*.

The O-nitroalkyl O-alkyl and N-alkyl phosphoramidothioates of the present invention may be prepared by reacting an alkali metal lower alcoholate with an O-nitroalkyl N-alkyl phosphoramidochloridothioate corresponding with the formula

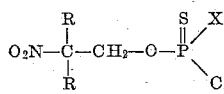

The reaction preferably is carried out in an inert organic liquid as reaction medium and conveniently in the alcohol from which the alcoholate is prepared. Good results are obtained when employing substantially equimolecular proportions of the reagents. The reaction is somewhat exothermic and takes place smoothly at temperatures of from −10° to 50° C. with the formation of the desired product and alkali metal chloride of reaction. The temperature may be controlled by regulating the rate of contacting the reactants and by external cooling. In carrying out the reaction, the reactants are mixed together in any convenient manner and at the contacting temperature range. Upon completion of the reaction, the reaction medium may be removed by evaporation or fractional distillation under reduced pressure, the reaction product dissolved in a water immiscible solvent such as benzene, and the solvent solution washed with water. The solvent is then removed by evaporation or by fractional distillation under reduced pressure to obtain the desired product as a residue. This product may be further purified by conventional means such as extraction with suitable solvents and recrystallized.

The O-nitroalkyl phosphorodiamidothioates of the present invention may be prepared by reacting a lower alkyl amine with an O-nitroalkyl phosphorochloridothioate corresponding to the formula

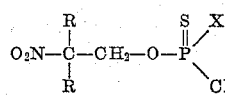

The reaction is carried out in the presence of an inert organic liquid as reaction medium. The reaction is somewhat exothermic and takes place smoothly at temperatures of from −10° to 50° C. with the formation of the desired product and amine hydrochloride of reaction. The temperature may be controlled by regulating the rate of contacting the reactants and by external cooling. Good results are obtained when employing at least two molecular proportions of the amine with each molecular proportion of the O-nitroalkyl phosphoroamidochloridothioate. In carrying out the reaction, the reactants are admixed together in any convenient manner and at a temperature of from −10° to 50° C. In an alternative procedure, symmetrical phosphorodiamidothioate compounds may be prepared by reacting four molecular proportions of a suitable lower alkyl amine with one molecular proportion of an O-nitrophenyl phosphorodichloridothioate corresponding to the formula

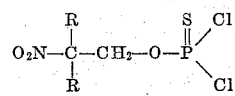

The conditions of reaction are exactly as previously described. Upon completion of the reaction, the reaction mixture may be washed with water or diluted with a water immiscible solvent and the resulting mixture washed with water. Upon removal of the solvent or reaction medium by evaporation or distillation under reduced pressure, the desired product is obtained as a residue. This product may be further purified by conventional procedures.

The following examples merely illustrate the invention and are not to be construed as limiting.

*Example 1.—O-(2-methyl-2-nitropropyl) N,N′-dimethyl phosphorodiamidothioates*

Methylamine (3.4 grams; 0.1058 mole) was introduced portionwise into a mixture consisting of 14 grams (0.0529 mole) of O-(2-methyl-2-nitrophenyl) N-methyl phosphoroamidochloridothioate dispersed in 500 milliliters of benzene. The addition was carried out over a period of 10 minutes with stirring and at a temperature of 5° C. The reaction mixture was then warmed to room temperature and stirring continued for 16 hours to complete the reaction. The solvent was thereafter removed by evaporation under reduced pressure to obtain an O-(2-methyl-2-nitropropyl) N,N′-dimethyl phosphorodiamidothioate product as a solid residue. This product was recrystallized from a 1:1 mixture of water and ethanol and found to melt at 42.5°–43.5° C. and have a nitrogen content of 16.77 percent as compared to a theoretical content of 17.42 percent.

*Example 2.—O-(2-methyl-2-nitropropyl) O-methyl N-methyl phosphoroamidothioate*

Sodium (4.6 grams; 0.2 mole) was dissolved in 1.1 liters of methanol to prepare a solution of sodium methylate. O-(2-methyl-2-nitropropyl) N-methyl phosphoroamidochloridothioate (49.3 grams; 0.2 mole) was dissolved in 100 milliliters of methanol and the resulting mixture added slowly portionwise to the above prepared solution of sodium methylate. The addition was carried out over a period of 0.5 hours with stirring and at a temperature of from 0° to 5° C. Stirring was thereafter continued for two hours at room temperature to complete the reaction. The reaction mixture was then filtered, the solvent removed from the filtrate by evaporation under reduced pressure and the residue diluted with 150 milliliters of carbon disulfide. The carbon disulfide solution was then washed with water and thereafter dried over anhydrous calcium chloride. The carbon disulfide was then removed from the dried mixture by evaporation under reduced pressure to obtain an O-(2-methyl-2-nitropropyl) O-methyl N-methyl phosphoroamidothioate product as a liquid residue having a refractive index n/D of 1.4885 at 25° C.

*Example 3.—O-(2-methyl-2-nitropropyl) O-isopropyl N-methyl phosphoroamidothioate*

Sodium (0.2 mole) was dissolved in 1.1 liters of isopropanol to prepare a solution of sodium methylate. O-(2-methyl-2-nitropropyl) N-methyl phosphoroamidochloridothioate (0.2 mole) was dissolved in 100 milliliters of isopropanol and the resulting mixture added slowly portionwise to the above solution of sodium alcoholate. The conditions of reaction and methods of separation were all as described in Example 2. As a result of these operations, there was obtained an O-(2-methyl-2-nitropropyl) O-isopropyl N-methyl phosphoroamidothioate product as a liquid residue having a refractive index n/D of 1.4798 at 25° C.

In a similar manner, other compounds of the present invention may be prepared as follows:

O-(2-methyl-2-nitropropyl) N,N,N',N'-tetraamyl phosphorodiamidothioate by reacting O-(2-methyl-2-nitropropyl) N,N-diamyl phosphoroamidothioate with diamyl amine.

O-(2-ethyl-2-nitropropyl) O-amyl N-methyl N-butyl phosphoroamidothioate by reacting O-(2-ethyl-2-nitropropyl) N-methyl N-butyl phosphoroamidochloridothioate with the potassium salt of amyl alcohol.

O-(2-butyl-2-nitropropyl) O-isopropyl N,N-dimethyl phosphoroamidothioate by reacting O-(2-butyl-2-nitropropyl) N,N-dimethyl phosphoroamidochloridothioate with potassium salt of isopropanol.

O-(2-propyl-2-nitrohexyl) N,N-diethyl N'-methyl N'-butyl phosphorodiamidothioate by reacting O-(2-propyl-2-nitrohexyl) N,N-diethyl phosphoroamidochloridothioate with N-methyl N-butyl amine.

O-(2-methyl-2-nitrooctyl) N-methyl N'-butyl phosphorodiamidothioate by reacting O-(2-methyl-2-nitrooctyl) N-butyl phosphoroamidochloridothioate with methyl amine.

N-(2-ethyl-2-nitrobutyl) N,N'-diethyl phosphorodiamidothioate by reacting O-(2-ethyl-2-nitrobutyl) phosphorodichloridothioate with ethyl amine.

The new compounds of the present invention are effective as parasiticides and are adapted to be employed for the control of many undesirable organisms. For such use, the products may be dispersed on an inert finely divided solid and employed as dusts. Also, such mixtures may be dispersed in water with the aid of a surface active agent, and the resulting aqueous suspensions employed as sprays. In other procedures, the products may be employed as constituents of oil-in-water emulsions or water dispersions with or without the addition of surface active dispersing agents. In representative operations, 100 percent controls of *Ascaris lumbricoides* are obtained with finely divided solid compositions containing 2500 parts by weight of O-(2-methyl-2-nitrophenyl) O-methyl N-methyl phosphoroamidothioate per million parts by weight of ultimate composition.

The O-nitroalkyl phosphoroamidochloridothioates employed as starting materials in accordance with the teachings of the present application may be prepared by reacting two molecular proportions of a suitable amine with one molecular proportion of an O-nitroalkyl phosphorodichloridothioate at a temperature of from −10° to 30° C. Upon completion of the reaction, the desired phosphoroamidochloridothioate is separated by conventional methods. The O-nitroalkyl phosphorodichloridothioates may be prepared by reacting a molecular excess of phosphorus thiochloride with a suitable nitro alcohol in the presence of a tertiary amine as hydrogen chloride acceptor. Good results are obtained when operating at temperatures of from 40°–100° C., and employing from four to ten moles of $PSCl_3$ with one mole of each of tertiary amine and nitroalcohol.

I claim:

1. The O-nitroalkyl phosphoroamidothioates corresponding with the formula

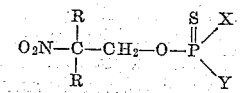

wherein each R represents lower alkyl, X represents lower alkyl amino and Y represents a member of the group consisting of lower alkoxy and lower alkyl amino.

2. O-(2-methyl-2-nitrophenyl) N,N'-dimethyl phosphorodiamidothioate.

3. O-(2-methyl-2-nitropropyl) O-methyl N-methyl phosphoroamidothioate.

4. O-(2-methyl-2-nitropropyl) O-isopropyl N-methyl phosphoroamidothioate.

No references cited.